Nov. 30, 1965  K. R. COOK ETAL  3,221,159
TIME DOMAIN UNIT FOR PROCESSING A SEISMIC SIGNAL
Filed May 27, 1960  3 Sheets-Sheet 1

Kenneth R. Cook
Duane E. Soland  Inventors
By John D. Gassett  Attorney

Kenneth R. Cook
Duane E. Soland     Inventors

By John D. Gassett     Attorney

United States Patent Office 3,221,159
Patented Nov. 30, 1965

3,221,159
TIME DOMAIN UNIT FOR PROCESSING A SEISMIC SIGNAL
Kenneth R. Cook, Albuquerque, N. Mex., and Duane E. Soland, North Minneapolis, Minn., assignors, by mesne assignments, to Esso Production Research Company, Houston, Tex., a corporation of Delaware
Filed May 27, 1960, Ser. No. 32,453
5 Claims. (Cl. 235—181)

The present invention relates to the analysis of seismic signals. It relates particularly to methods and apparatus for delaying and weighting seismic signals with respect to time.

Many data processing methods have been applied to the analysis of seismic signals in recent years. One such arrangement has been the filtering action used in an ordinary tuned-circuit filter. An advancement from the tuned-circuit filter has been the development of methods and apparatus for the time domain analysis of seismic signals. Two primary requirements for a time domain unit are (1) to select samples at equal increments of time along the input function, and (2) to weight these samples according to some impulse response; that is, the desired filter characteristic. Data representing these selected samples are multipled by a weighting function and the product integrated over the duration of the weighing function.

Analytical operations carried out in the time domain have many advantages over those employed in the past. The most prominent of these is the flexibility of time domain systems of analysis, particularly for creating filter means which cannot be created with ordinary circuitry, for analyzing time functions for the frequency contents, for correlating one signal with another and for the insertion of corrections in a signal. The heart of any time domain processing device is a tapped delay line of some sort. In the past, lumped constant delay lines and rotating magnetic delay lines have been employed as tapped delay lines. Lumped constant delay lines include conventional lumped constant inductance and capacitance elements arranged in a network and provided with delay taps at periodic intervals along the length of the network. Delay lines of this type are not particularly suited for seismic applications because their frequency response becomes unduly limited when long delay periods and large numbers of delay taps are required. The other commonly used delay line is a rotating drum carrying a magnetic recording medium on its surface, a recording head for recording a signal on the recording medium, a pickup head spaced from the recording head. Necessary demodulators are provided to recover the signals at intervals as the drum rotates. This roating magnetic delay line type unit has proved useful; however, it too has a serious limitation. For example, the number of delay taps that can be obtained is limited by the practical consideration of drum diameter and head size.

Briefly, in a preferred embodiment, the present invention includes means whereby samples of the seismic signal being analyzed are obtained at discrete intervals timewise. The data thus obtained are quantitized in binary code and stored in the matrix of magnetic cores. The stored information is subsequently sequentially decoded in analog form where it is operated upon with a weighting function.

In analytical operations, knowledge of the input function and the network function of an electrical system in terms of time permits determination of the output response of the system by use of the convolution integral without transposition into the frequency domain. Each impulses applied to the system causes the initiation of an individual impulse response whose characteristics are determined by the network function of the system. After several such impulses have been applied to the system, the resulting output response at any later time can be determined by totaling the effects of all the impulses which have occurred up to that time. If the individual impulses applied to the system are brief enough, the output response of the system can be considered to be the integral of the input function between limits of plus and minus infinity multiplied by the input impulse response shifted in time. This results in superimposition of all of the impulse responses which have resulted from impulses in past time. Superpositioning of impulse responses and the time domain is utilized for analyzing electrical transients in accordance with the system disclosed herein by considering a characteristic of the function to be analyzed as a system impulse response and weighting samples of an input sinusoidal signal in accordance with that response at regular delayed time intervals.

Time domain filtering and smoothing of time signals is based upon one fundamental theorem of linear network theory.

Assume the linear, physically realizable network is represented by the transfer function, $G(\omega)$. Further assume that the input function may be represented as $X(\omega)$. $G(\omega)$ and $X(\omega)$ may be considered as either the Laplace transform or the Fourier transform of the time functions $G(t)$ and $X(t)$ respectively. The response tof the system to $X(\omega)$ is given as, (1) $\quad Y(\omega) = G(\omega) X(\omega)$ The corresponding time function, $Y(t)$ is found to be:

(2) $\quad Y(t) = \int_0^t X(\tau) G(t-\tau) d\tau = \int_0^t G(\tau) X(t-\tau) d\tau$ The integral for $Y(t)$, in Equation 2, is the well known convolution integral representing the response of the system, $G(\omega)$ to the input $X(\omega)$ or more specifically, $Y(t)$ represents the time response of a linear system to the function $X(t)$. The linear system having the impulse response function, $G(t)$.

Knowledge of $G(t)$ and $X(t)$ permits one to determine $Y(t)$ by the fundamental integral relationship expressed in Equation 2. Physically, Equation 2 states that in order to produce function $Y(t)$ at some time, for example, $t_0$, weight the function $X(t_0-\tau)$ over the interval, $(0-t_0)$ and integrate the weighted function over the interval $(0-t_0)$. Therefore if one desires the output at time $t_0$, one must have available all past values of the function $X(t)$ for $0 \leq \tau \leq t_0$. If $t_0$ becomes rather large the problem of storting all past values of $X(t)$ likewise becomes rather large for most storage devices. It is an object of this invention to provide a method of storing an input function $X(t)$ on which the desired weighting and integration may be performed.

The nature and objects of the invention can best be understood by referring to the following description of the method and apparatus employed in this practice and to the accompanying drawings in which.

Figure 1:
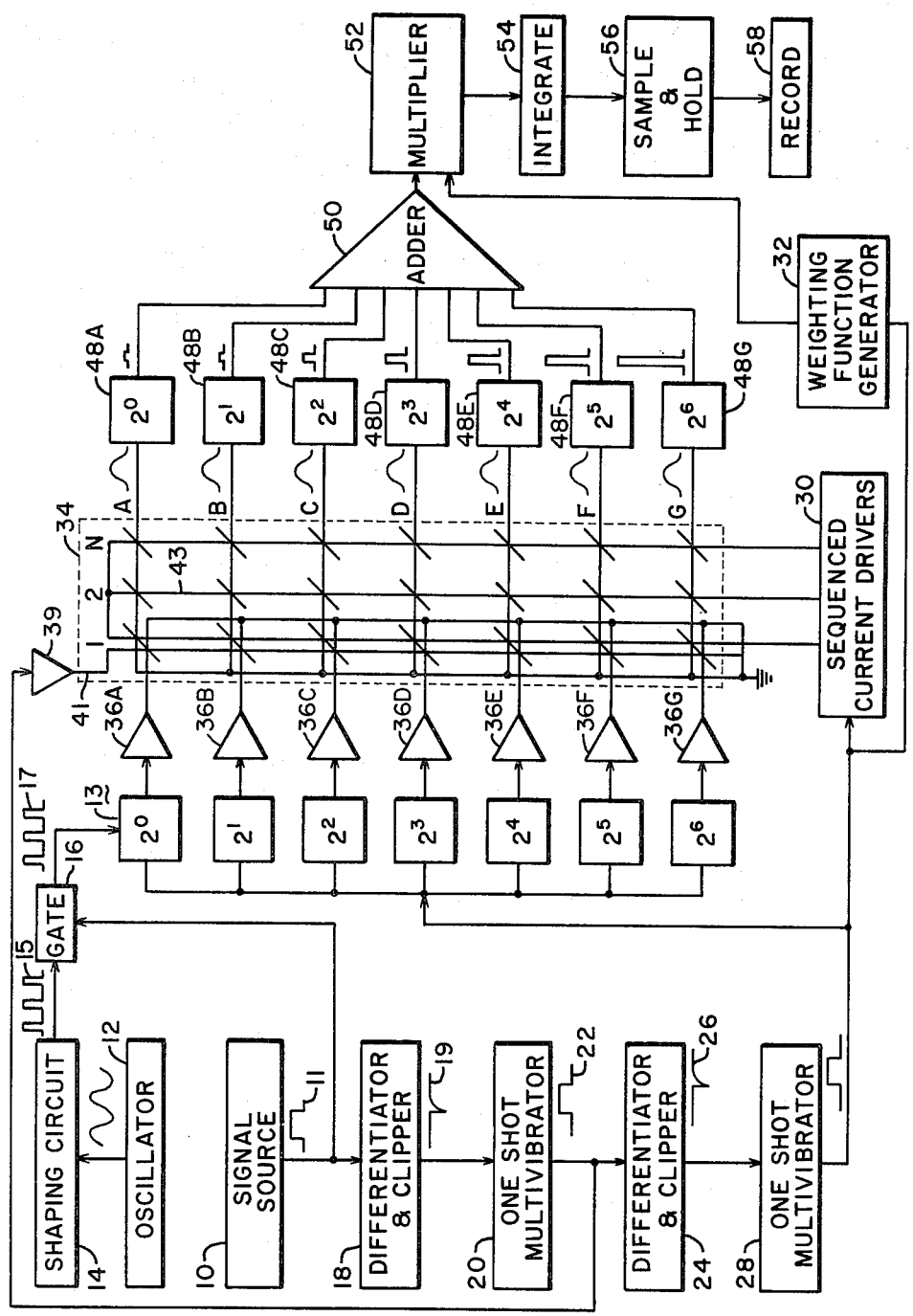
FIG. 1 illustrates schematically in block diagram form an electronic delay line useful in carrying out the present invention.

Attention will now be directed to the drawings and FIG. 1 in particular, which illustrates in schematic block diagram form the best mode contemplated for carrying out the invention. Reference numeral 10 designates a signal source. For the purpose of this illustration, it will be assumed that the signal source is a stored seismic signal in reproducible pulse width modulated form. The seismic signal may, for example, have been stored on magnetic tape. In a pulse width modulated signal the leading edge of each pulse occurs at regular periods in time whereas the trailing edge is varied in position with respect to time according to the amplitude of the signal whose information is being recorded. For the purpose of this illustration, it will further be assumed that signal source 10 passes every other square pulse. As will be seen, this gives additional operating time to the other components of the system thus making the design of the system simpler.

Reference numeral 12 refers to an oscillator which has an output waveform in the radio frequency range. The oscillator should have the ability to produce $2^7$ cycles for the maximum width of pulse 11 for the particular system illustrated. It is anticipated that an oscillator of one megacycle per second is suitable for most operations using the system disclosed herein. The output of oscillator 12 is fed to shaping circuit 14. The output of shaping circuit 14 is a series of pulses of very short duration with each pulse occurring at the zero crossing of the sinusoidal waveform fed to shaping circuit 14. The output of shaping circuit 14 is fed to gate 16. The output of signal source 10 is also fed to gate 16. Gate 16 is of a character to pass the pulses from shaping circuit 14 therethrough during the receiving of a square pulse from signal source 10. In other words, pulses 15 are continually being fed to gate 16 but are passed therethrough only during the duration of the square pulse from signal source 10. The number of pulses which are passed through gate 16 then is a function of the width of the square pulse which is a function of the amplitude of the seismic signal being processed. The output 17 of gate 16 is fed to binary counter chain 13. The binary counter chain 13 is illustrated as having seven stages; in other words, the binary counter can count to two to the seventh power before it has to start over. It will, of course, be understood that various number of stages may be used as desired. Increasing the count increases the quantization levels.

The output of signal source 10 is also fed to differentiator and clipper circuit 18 which generates a sharp pulse for each trailing edge of the square pulse 11 fed to it. The output of differentiator and clipper circuit 18 is fed to a one-shot multivibrator 20 which is of a character to generate a square wave 22 whose leading edge is coincident in time with each sharp pulse of wave 19. The output of one-shot multivibrator 20 is fed to a second differentiator and clipper circuit 24 which is of a character to have an output waveform having a sharp pulse for each trailing edge of the square pulse waveform 22. The output wave signal of differentiator and clipper circuit 24 is fed to one-shot multivibrator 28 which is of a character to have an output waveform of square pulses whose leading edges are coincident in time with the sharp spikes of waveform 26. The output of one-shot multivibrator 28 is fed to, and is used to reset, binary counter 13. The output of one-shot multivibrator 28 is also fed to sequence current drivers 30 and to weighting function generator 32. Sequenced driver 30 may conveniently be a series of one-shot multivibrators in series with each multivibrator commanding the next one to start. Sequence current drivers 30 may comprise N delay multivibrator (Phantastrons) of delays $D_1, D_2 \ldots D_N$ such that the output of multivibrator 28 applied to the delay multivibrator causes each to pulse in turn. Function generator 32 is of a character to generate a voltage output upon command, proportional to the weight or value to be placed upon each bit of information, which has previously been stored in the core matrix, with respect to time during a certain duration.

Attention will next be directed toward the memory core unit 34. There are 1 to N columns of wound magnetic cores. Each column has a magnetic core for each stage of binary counter 13. Current drivers 36A through 36G are provided to connect the various stages of binary counter 13 with rows A through G, respectively, of column 1 of binary storage unit 34. If each pulse 11 from signal source 10 represents seismic information over 2 milliseconds, each column likewise represents 2 milliseconds. If one second of a seismic record is desired to be stored at a time, then $N=500$; i.e., 500 columns are needed in unit 34.

Figure 2:
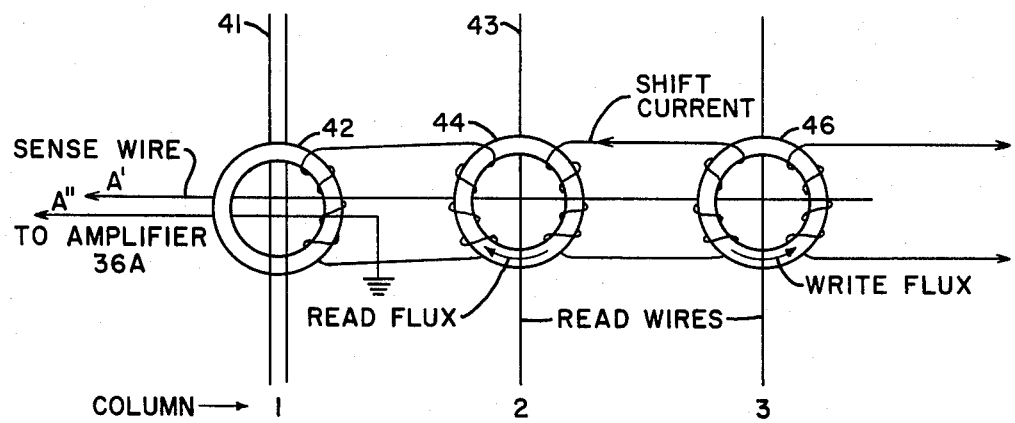
FIG. 2 illustrates wiring on the magnetic cores.

Reference is now made to FIG. 2 in particular to more clearly illustrate the nature of the individual cores of binary storage unit 34 and how they are wound. Illustrated in FIG. 2 are three magnetic cores. Each core 42, 44 and 46 is preferably a standard toroidal magnetic core and preferably made of ferrite core.

Let core 42 represent the core in row A, column 1; core 44 represent row A, column 2 and core 46 represent row A, column 3. Sense wire A' passes under the left side of each core and over the right side of each core. Shift windings between the cores perform the operation of shifting the state of core 42 to core 44 and from 44 to 46 when called upon by the sequenced current drivers.

Assume core 44 and core 42 are in the "1" state as commonly referred to in the ideal hysteresis loop. When the sequenced current drivers 30 provide a read current pulse to column 2, the current through line 43 will provide sufficient magnetic flux to reset the core 44 to the "0" state. In doing so, core 44 will provide sufficient flux to induce a current in the sense winding A' and a voltage in the shift winding on the right hand side of core 44. This voltage will produce sufficient current to set core 46 in the "1" state due to the common shift windings of cores 44 and 46. As it is not desired to alter the state of core 42 during the reading of core 44, the turns ratio of the shift windings must be such that for a given rate of change of magnetic flux in core 44, the core 46 will be reset while core 42 will be unaltered. With this condition met, a pulse supplied to row 2 will shift the information previously stored in core 44 to core 46 and at the same time provide a current pulse in the sense wire A' to be amplified by amplifier 48A.

Then when the sequenced current driver steps to column 1, the same operation will occur, only now the information in core 42 will be transferred to core 44.

During one read cycle of the sequenced current drivers, each column will be read and simultaneously shifted to the column immediately to its right. One might describe the action as the "bucket brigade."

Information is written into the matrix only in column 1, then for each reading cycle this information is shifted one column to the right so that if there are N columns, the information in column 1 will arrive at column N on the $(N-1)^{th}$ read cycle following the insertion of the information in column 1. The information in column N is destroyed during the read period of column N.

Information is written into column 1 by the coincidence of half current pulses supplied by current driver 39 and the binary counter output amplifiers 36A through 36G.

For example, suppose the pulses 17 provide a signal such that amplifier 36A is the only amplifier of the 36 group with an output. Then when current driver 39 is provided with a pulse from the one-shot multivibrator 20, the core in row A will receive a half-write pulse from 36A and from current driver 39; hence it has received a full-write current pulse and will be set to the "1" state. The cores in column 1, rows B through G, will receive only one-half write pulses and will not change state. Had all rows been provided with the current pulses from the binary counter, then each row would have been set to the "1" state with the coincidence of the current pulse from current driver 39.

The purpose of the one-shot multivibrator 28 is to produce the initiating pulse for the sequenced current drivers. The sequenced current drivers provide a current pulse of sufficient amplitude to reset the state of any magnetic core from a "1" state to a "0" state. These pulses begin with column N and progress to column 1, reading each column one time during the reading cycle. If any core has been previously set to state "1" then when the read pulse is applied to the changing magnetic flux of the core will induce a current pulse in the sense wire which provides the input to the corresponding amplifier of the amplifier group 48A to 48G.

Due to the shift windings, each time a core is "read" it will transfer its previous state to the core in the same row and immediately to its right. If one is reading a column K (between column 1 and column M) and the core corresponding to row G, column K has previously been set to the "1" state; then the core in row G and column $K+1$ will be set to the "1" state. During one complete reading cycle the information stored in each column 1 to N is read and shifted one column to the right which allows column 1 to be set to "0" which is now ready for the next quantitized signal amplitude to be stored in column 1.

Pulse generators 48A through 48G are each of such a character as to generate a pulse of standard height and duration if the core being read has a value stored therein representative of the "1" state. If the value stored is representative of the "0" state, pulse generator 48A has no output. The various outputs from pulse generators 48A through 48G are fed through adder 50 where their sum is added and the output is passed to multiplier 52. Also fed to multiplier 52 is the output of weighting function generator 32. The output of adder 50 and weighting function generator 32 then are multiplied in multiplier 52. The output of multiplier 52 is fed to integrator 54 where the output of multiplier 52 is integrated. The output of integrator 54 is sampled by sample and hold circuit 56 and the output of sample and hold circuit 56 is recorded on recorder means 58.

Figure 4:
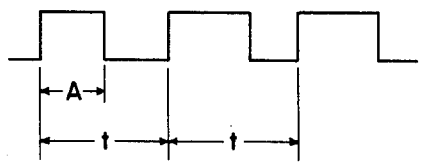
FIG. 4 illustrates a pulse width modulated seismic signal.
Figure 3:
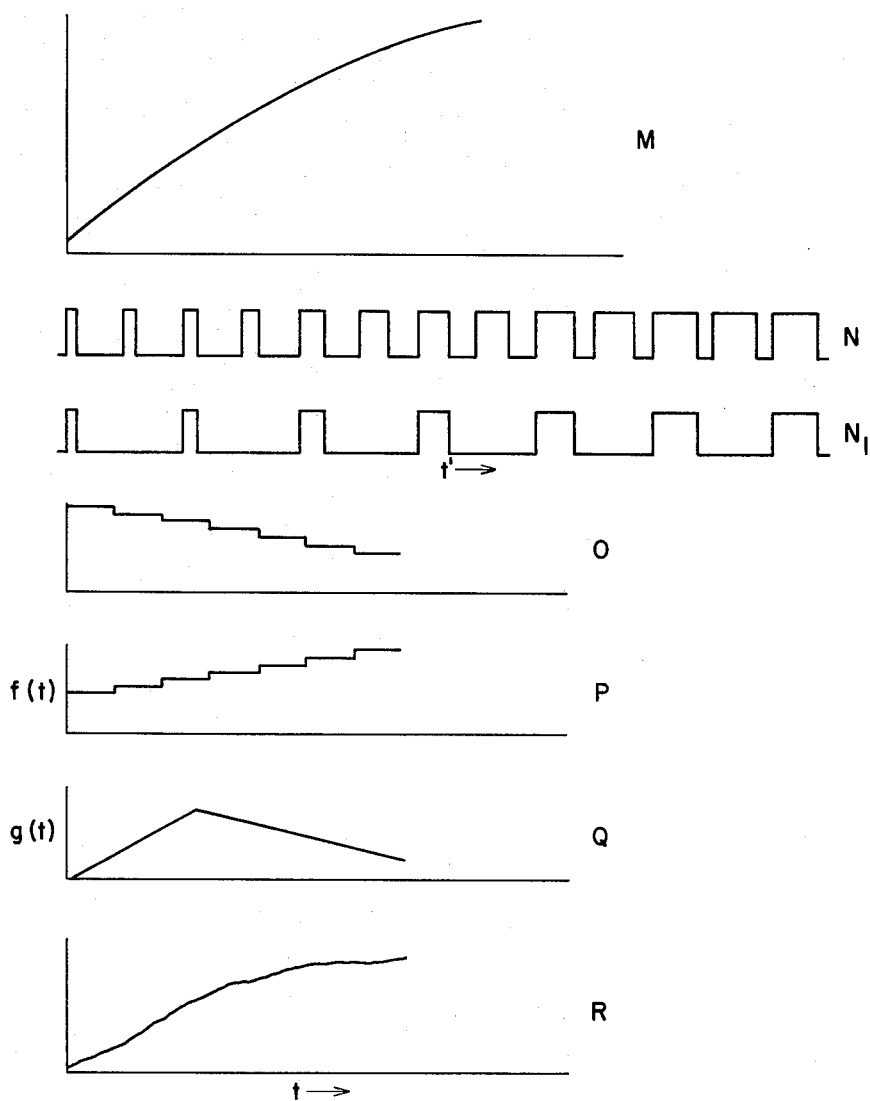
FIG. 3 illustrates curves of various waveforms occurring at various parts of the circuitry.

Having described the principal component parts of the embodiment of FIG. 1, attention will now be directed toward its operation. In this regard, reference will also be made to curves shown in FIG. 3. In FIG. 3, N represents the pulse width modulated waveform from signal source 10. The original seismic signal which waveform N represents is represented by waveform M. In order to insure ample time for operations hereunder, it is normally convenient to pass every other pulse from signal source 10. In other words, there must be enough operating time between the trailing edge of one pulse and the leading edge of the next pulse to permit operations of the various electronic functions. In the device shown, it is contemplated that this can be accomplished conveniently by having at least one millisecond between the trailing edge of one pulse and the leading edge of the next succeeding pulse. Referring to FIG. 4, if pulses are formed at the rate of 1,000 per second, then the time $t$ between the leading edges of the pulse is one millisecond. As the trailing edge of the pulse varies according to amplitude, the width of a pulse could approach one millisecond. However, by using every other pulse, one is assured of having at least one millisecond in which to perform the electronic operations. The pulses which are fed to gate 16 and to differentiator clipper 18 then are illustrated in curve $N_1$.

During the time A of each pulse as represented in FIG. 4, gate 16 is opened and permits pulses 15 from shaping circuit 14 to pass therethrough. The number of such pulses passed therethrough is dependent then upon the width of the pulse which in turn was modulated by the amplitude of the original seismic signal. The output through gate 16 then is fed to binary counter 13 where the number of pulses are counted. If, for example, ten pulses are passed to the binary counter the second stage which is $2^1$ and the fourth stage which is $2^3$, which represents time A, will each pass a pulse to pulse generator 36A and 36D. A current then is passed through row B and D of magnetic core storage unit 34.

The pulse from signal source 10 is fed to differentiator and clipper circuit 18 which has an output of a sharp pulse for each trailing edge of the pulse fed thereto. The waveform 19 is fed to one-shot multivibrator 20. The output of one-shot multivibrator 20 then is a square pulse represented by 22. This pulse occurs at the closing of gate 16 at which time the binary counter has stored the information as to the number of pulses passed through gate 16. The ouput 22 of one-shot multivibrator 20 then is fed to driver 39. A half current then is passed through wire 41 through the first row of magnetic cores. At the same time, certain of the drivers 36A to 36G are passing a half current through write-in wire A″ through the cores of column 1. If, for example, the value which the binary counter has is 10 then stages B and D are passing half current. Therefore, in that example, the magnetic cores at the intersection of column 1 and rows A and D have full current flowing therethrough which is the value of current necessary to produce the flux density in the core such that the core will be set in the stable state, designated as the "1" state.

The pulse from one-shot multivibrator 20 is also fed to differentiator and clipping circuit 24 which has a sharp spike output for the trailing edge of the pulse 22. The output of differentiator and clipper circuit 24 is fed to a second one-shot multivibrator 28. The leading edge of the pulse from multivibrator 28 occurs timewise with the trailing edge of pulse 22, the output of multivibrator 20. The duration of pulse 22 in this illustration is preferably about 10 microseconds. The width of pulse 22 depends somewhat on the type of cores used. The output of one-shot multivibrator 28 is fed to binary circuit 13 to reset it to zero position, to sequence current driver 30 to start the readout of column N and the shifting of information stored in each column one column to the right, and to weighting function generator 32. The readout is from column N to column 1, i.e. right to left. When only one pulse from source 10 has opened gate 16, only column 1 of binary storage unit 34 has information stored therein. Therefore, energization of wires N through 2 results in no current being passed through to pulse generators 48A to 48G. The information that was stored in column 1 is read and is shifted one column to the right and is next stored in column 2. This sequence is repeated and after N pulses from signal source 10 every column in storage unit 34 has information stored therein.

Each column is read independently of the others and its information is passed to pulse generators 48A through 48G. The columns are read subsequently from N back through column 1. The outputs of amplifiers 48A through 48G are fed to the adder such that the input to the multiplier will be the sum of all inputs to the adder. Amplifier 48A will provide a pulse of fixed width and one unit of amplitude, 48A provides a pulse of the same width but of $2^1$ units of amplitude and finally amplifier 48G will provide a pulse of the same width with an amplitude of $2^6$ units. The unit of amplitude will depend on the multiplier and the input from the weighting function generator. For example, the base unit may be one volt for certain applications but for another it may be only a millivolt, depending on the capability of the multiplier. The information stored in storage unit 34 is depicted in curve O of FIG. 3. The information which is read out is added in adder 50 and the output of adder 50 is represented by curve P. The waveform P is fed to multiplier 52. At the same time that sequence current driver 30 is initiated the weighting function generator is also excited and has an output G(t) which is a weighting function such as illustrated in Q. The output of multiplier 52 is fed to integrator 54 which integrates the value of the information for each sweep of sequence current driver 30. This value is fed to and held by sample and hold circuit 56 until the next sweep is integrated. The integration sampling and holding is performed on a much shorter time scale than the sampling and holding of the core matrix. That is if, for example, the information stored in each column corresponds to the amplitude of the input signal at 2 millisecond intervals then during the reading time, which will be on the order of 1 millisecond, the entire portion of the input signal which will be $N \times 2$ milliseconds, is fed to the integrator and hold circuit. The output from sample and hold circuit 56 is fed to recording means 58 where a record is made of it.

The time domain unit shown above is quite useful in synthesizing transfer functions not easily realizable by ordinary passive circuits. In the system described, the multiplication of the data with a weighting function and integration of the duration of the weighting function is accomplished. That is, the input signal is quantitized in binary code, stored in core matrix and decoded to analog form for arithmetic operations with a weighting function.

It is to be understood that many modifications in the method and apparatus disclosed herein may be made without departing from the scope of the present invention. If is desired, therefore, that only such limitations be imposed on the appended claims as are stated therein, or required by the prior art.

What is claimed is:

1. A magnetic core time domain unit for synthesizing transfer functions to a seismic signal which comprises in combination: first means to generate a pulse width modulated carrier signal modulated by said seismic signal; oscillator means for generating high frequency equally spaced pulses; a binary counter having N stages; gating means connected to said first means, to said oscillator means, and to said binary counter, of a character to pass pulses from said oscillator means to said binary counter during the duration of each commanding pulse of said pulse width modulated carrier signal; a first differentiator and clipper circuit connected to said first means and of a character to generate a sharp spike for each trailing edge of each commanding pulse of said carrier; a first one-shot multivibrator connected to said first differentiator and clipper circuit, of a character to generate a square pulse for each peak generated by said differentiator and clipping circuit; a second differentiator and clipper circuit connected to said first multivibrator, of a character to generate a sharp spike for the trailing edge of each pulse from said first one-shot multivibrator; a second one-shot multivibrator connected to said second differentiator and clipper circuit, for generating a square wave pulse for each spike generated by said second differentiator and clipping circuit; a binary magnetic core storage unit having 1 through N columns of magnetic cores and $N_1$ cores in each column thus forming $N_1$ rows; means connected to said storage unit and to said second multivibrator for driving a one-half magnetization current through said first column of cores at each pulse generated by said first one-shot multivibrator; means to generate a one-half magnetization current for each stage of said binary counter when the stage for said means is to be counted; means connecting the output of each generating means for each stage with its corresponding rows of cores; a second series of N pulse generators connected to the output side of each row of said cores, each pulse generator being of a character to emit a signal having an amplitude proportional to the digital information stored in the core being read; adder means connected to the output of each said second series of pulse generators; a multiplier means electrically connected to the output of said adder means; a sequenced current driver means electrically connected to the output of said second one-shot multivibrator for driving a one-half magnetization current through each column of said cores sequentially from N through 1 responsive to reception of a pulse of said second one-sot multivibrator; a weighting function generator means electrically connected to said multiplier electrically connected to and actuated upon receiving the output of said second one-shot multivibrator; an integrator means electrically connected to the output of said multiplier; a sample and hold circuit electrically connected to the output of said integrator means and a recording means electrically connected to the output of said sample and hold circuit.

2. An apparatus for processing a seismic signal in which a carrier has been pulse width modulated by a seismic signal which comprises in combination:

a binary counter having a plurality of stages;
means including a quantitizing oscillator connected to said binary counter of a character to supply output pulses of a high frequency to said counter for storage therein as a count during the positive portion of the pulse width modulated carrier;
a core matrix means connected to said binary counter having a plurality of columns of cores with each column having a core for each stage of said binary counter;
first means for each stage of said binary counter and of a character to supply write pulses to one row of cores responsive to an actuating write pulse applied thereto;
means connected to said first means for supplying an actuating pulse thereto to store the count stored in said binary counter to the first column of the matrix at the end of each pulse of said pulse modulated carrier;
reading means to read binary information sequentially stored in said cores of said core matrix from each of said columns responsive to an actuating pulse applied thereto, said reading means including means to move sequentially information from one column to its advanced adjacent column;
weighting function generator means for generating a weighting function signal responsive to an actuating pulse applied thereto;
means connected to said weighting function generator means and to said reading means for concomitantly supplying an actuating pulse thereto at the end of each of said actuating pulse to said first means; and
multiplying means to multiply said weighting function of said weighting function generator means and said information read from said reading means.

3. An apparatus for processing a seismic signal in which a carrier has been pulse width modulated as by a seismic signal which comprises in combination:

oscillator means of a character to supply output pulses of a high frequency;
a binary counter having a plurality of stages;
gating means connected between said oscillator means and said binary counter, said gating means being opened during the positive portion of the pulses of said pulse width modulated signal so that said pulses from said oscillator means are counted by said counter;
core matrix means connected to said binary counter having a plurality of columns of cores with each column having a core for and connected to each stage of said binary counter;
reading means connected to said core matrix and responsive to an actuating signal applied thereto to read binary information sequentially from each said column and to produce an output signal indicative of said read information, said reading means including means to sequentially advance information from one column to its next adjacent column;
a weighting function signal generator means for producing a weighting function output signal responsive to an actuating signal applied thereto;

multiplying means connected to said reading means and to said weighting function signal generator means for multiplying said information from said reading means and the output of said weighting function signal generator means;

integrating means for integrating the output of said multiplying means; and means for transferring the count stored by said counter to said column of said core matrix at the end of each pulse of the pulse modulated carrier, and thereafter supplying actuating signals to said reading means and to said weighting function signal generator means.

4. An apparatus for processing a seismic carrier signal which has been pulse modulated which comprises:

first means for generating a quantitizing oscillating signal whose frequency is at least twice the highest frequency of the occurrences of the pulses in the carrier signal;

second means connected to said first means for counting the oscillations from said first means occurring during each pulse width of said carrier signal;

third means connected to said second means for holding information representative of the number of said oscillations generated during a pulse width of said carrier signal obtained from a plurality of adjacent pulses over equal but displaced time increments;

fourth means for repetitively recovering the total information stored by said third means as a delayed signal;

fifth means for repetitively generating a weighting function signal concurrently with recovery of information by said fourth means;

sixth means for multiplying said information from said fourth means by the weighting function of said fifth means to obtain an output product; and seventh means for obtaining the integration of the output product of said sixth means.

5. An apparatus for processing a seismic signal in which a carrier has been pulse width modulated as by a seismic signal to obtain a pulse width modulated signal which comprises in combination:

oscillator means of a character to supply output pulses of a high frequency;

a binary counter having a plurality of stages;

gating means between said oscillator means and said binary counter, said gating means being open during pulses of said pulse width modulated signal so that pulses gated thereby are counted by said binary counter as a count stored in the stages thereof;

core matrix means having a plurality of columns and rows of cores, each row having a core connected to a stage of said binary counter;

first means responsive to an actuating signal to transfer a count stored in the stages of said counter to the cores in a row of said core matrix means;

reading means responsive to an actuating signal to read information sequentially from each said column and to produce an output signal indicative thereof, and to transfer the count stored in the cores of each column to a column next adjacent said each column;

a weighting function signal generator responsive to an actuating signal for generating a weighting function signal;

multiplying means connected to said reading means and to said weighting function signal generator for multiplying said weighting function of said weighting function signal generator with the output signal from said reading means; and means connected to said first means, said reading means, and said weighting function signal generator for supplying an actuating signal to said first means after each pulse of said pulse width modulated signal, and to concomitantly supply actuating signals to said weighting function signal generator and to said reading means after each actuating signal supplied to said first means.

References Cited by the Examiner

UNITED STATES PATENTS

| | | | |
|---|---|---|---|
| 2,676,206 | 4/1954 | Bennett et al. | 340—15.5 |
| 2,840,308 | 6/1958 | Van Horne | 235—181 |
| 2,875,432 | 2/1959 | Markow | 340—347 X |
| 2,884,621 | 4/1959 | Ross | 340—174 |
| 2,907,021 | 9/1959 | Woods | 340—347 |
| 2,946,044 | 7/1960 | Bolgiano | 340—172.5 |
| 2,968,022 | 1/1961 | Unterberger | 340—15 |
| 3,015,086 | 12/1961 | Heintz | 340—15.5 |
| 3,018,962 | 1/1962 | Jones et al. | 340—15.5 |
| 3,103,579 | 9/1963 | Green | 235—151 |

MALCOLM A. MORRISON, *Primary Examiner.*

EVERETT R. REYNOLDS, *Examiner.*